2,748,177

FLUORINATION

Charles B. Miller, Lynbrook, N. Y., and John D. Calfee, Dayton, Ohio, assignors to Allied Chemical & Dye Corporation, New York, N. Y., a corporation of New York No Drawing. Application August 3, 1951,
Serial No. 240,289

4 Claims. (Cl. 260—653)

This invention relates to the preparation of organic fluorine compounds and in particular to the fluorination of certain saturated organic halogenated compounds containing not more than two carbon atoms.

According to known methods for preparing organic fluorine compounds, chlorinated hydrocarbons have been treated with liquid fluorinating agent such as antimony halide, $SbF_3$, alone or in combination with $SbCl_5$. Such procedures suffer from many disadvantages, among which are the corrosiveness of the antimony halide catalyst, the difficulty and complexity of operation involved by reason of the use of a liquid catalyst as distinguished from a solid catalyst and the relatively high volatility of the antimony halides, thereby giving rise to formation of products which contain small amounts of the catalyst as impurity, which impurity is not easily removed. Hence, objects of the present invention include development of an efficient and completely gas phase method for preparing organic fluorine compounds having one or two carbon atoms by employing a novel and advantageous solid catalyst.

It has been discovered, according to the present invention, that organic fluorine compounds may be conveniently prepared by contacting a saturated organic halogenated compound containing not more than two carbon atoms and at least two halogen atoms other than fluorine attached to the same carbon atom, with a solid aluminum fluoride catalyst which is substantially non-crystalline in structure, in the gas phase and in the presence of hydrofluoric acid.

Of the above indicated starting materials i. e. saturated organic halogenated compounds containing not more than two carbon atoms (that is, aliphatic compounds) and at least two halogen atoms other than fluorine attached to the same carbon atom, we prefer those compounds in which said two halogens are chlorine. A further characteristic of preferred starting material is a maximum hydrogen content of two atoms per molecule. Certain operating advantages are afforded by use of organic completely halogenated fluorine compounds (i. e. halocarbons, that is compounds consisting of carbon and halogen) containing not more than two carbon atoms and at least two halogen atoms other than fluorine attached to the same carbon atom. Of the one carbon atom starting materials (methanes) $CCl_4$, $CHCl_3$ and $CH_2Cl_2$ are specific examples of suitable starting material. Of the two carbon atom compounds (ethanes) $CHCl_2$—$CF_2Cl$ and the halocarbons $CCl_3CClF_2$ and $CCl_3CF_3$ are specific examples of suitable starting material.

The aluminum fluoride used as catalyst according to the present invention has the property of catalyzing fluorination of the above described organic halogenated compounds to form organic fluorine compounds to such an extent that good yields (percentage of sought-for product recovered based on the amount of such product theoretically obtainable from the starting material converted), conversions (percentage of starting material which undergoes reaction), and efficient and smooth operation may be realized under readily maintained operating conditions. Hence, when the starting material is contacted in the presence of gaseous HF with $AlF_3$ catalyst, fluorination to sought-for product takes place and the desired objects set forth above are realized.

Aluminum fluorides from a multiplicity of sources are known in the art. The majority of such materials consists of lumps or smaller discrete particles, which lumps or particles in turn are composed of $AlF_3$ crystals of relatively large size, i. e. not less than one thousand and usually several thousand Angstrom units radius and above, as in the case of commercial types of aluminum fluoride available on the market. However, certain forms of $AlF_3$, when examined even by the highest powered optical microscope, appear to be of non-crystalline or "amorphous" structure. When such "amorphous" aluminum fluorides are examined using X-ray diffraction technique, extremely small, sub-microscopic crystals, "crystallites," may be detected. According to the invention, such "amorphous" aluminum fluorides, having crystals of certain sub-microscopic (crystallite) size, are used in the fluorination of organic halogenated compounds. Enhanced catalytic activity may be noted by use of aluminum fluorides of crystallite size of about 500 A. radius or below. As crystallite size decreases below this value, desired catalytic activity increases and particularly suitable aluminum fluorides includes those having crystallite size of about 200 A. and below, (as determined by X-ray diffraction technique). It has been found that by contacting organic halogenated compound with the improved catalyst, transformation to organic fluorine compound may be realized under favorable and easily maintained operating conditions. Although advantageous catalytic properties realized in practice of the invention are peculiar to crystallites, such properties are not destroyed but merely diluted by the presence of the crystals.

Aluminum fluorides having the indicated crystallite size and catalytic activity are included within the scope of the invention regardless of method of preparation. However, according to a particular embodiment of the invention, improved catalytic material is employed which is prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, catalyst may be prepared by treating solid hydrated aluminum halide with gaseous fluorinating agent (said agent being preferably, but not necessarily, anhydrous) at temperature high enough so that the water in the hydrate is volatilized into the gas, e. g. preferably above about 100° C. to 170° C., the maximum temperature for avoiding fusion depending largely upon the degree of hydration of the reactant, and the water content, if any of the fluorinating agent. If desired, anhydrous reagents may be employed, in which case maintenance of particular temperatures during the catalyst preparation reaction is not as critical and said reaction may be carried out with fluorinating agent in the liquid phase. Of the fluorinating agents which may be used for catalyst preparation, boron trifluoride and hydrofluoric acid may be mentioned. We prefer anhydrous hydrofluoric acid. Anhydrous aluminum chloride is the preferred halide. Catalyst synthesis reaction is believed to proceed as follows:

$$3HF + AlCl_3 = AlF_3 + 3HCl$$

HF displaces HCl causing transformation of $AlCl_3$ into $AlF_3$. The remaining aluminum fluoride may be activated by heating in an anhydrous atmosphere at elevated temperature, i. e. temperature at which activation takes place (presumably accompanied by vaporization and removal of any amounts of water of hydration). The finished catalyst is then recovered. It has been found that heating the AlF₃ in a stream of dry nitrogen or HF gas for about one to four hours at temperatures of about 300–350° C. or four to six hours at 250–300° C. is ordinarily suitable for this purpose.

If desired, the catalyst may be activated by heating the AlF₃ in a stream of free oxygen-containing gas such as oxygen or air at about 400–600° C. for approximately 30 minutes to six and one-half hours (depending mostly on the O₂ content of the treatment gas), in which case activation with dry nitrogen or HF gas as aforesaid, may be omitted. Catalyst so activated with free oxygen gas has particular enhanced activity for fluorination of organic halogenated compounds. Hence, preferred procedure for activation of AlF₃ to be used as fluorination catalyst comprises such treatment.

Although not essential to realization of the objects of the invention, a suitable and convenient means for preparing the aluminum fluoride catalyst is to add solid anhydrous aluminum chloride to an excess of liquefied anhydrous hydrofluoric acid in a cooled container and, after complete addition of the aluminum chloride, mildly agitate the mixture until reaction is substantially complete. The AlF₃ so prepared is then activated as outlined above. Following is an example in which parts and percentages are on a weight basis, illustrating preparation of AlF₃ catalyst according to the latter procedure.

*Example A*

300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% AlF₃ content and containing less than 0.15% chlorine were recovered. This AlF₃ was heated in a stream of dry inert gas (nitrogen) at a sufficiently elevated temperature (250–300° C.) and a period of time sufficiently long (4–6 hours) to drive off residual amounts of water and activate the material. An X-ray diffraction pattern of material prepared according to the method outlined above, indicated crystallite size to be less than 100 Angstrom units radius, i. e. the crystallite size was so small as to be indicative of "amorphous" structure as desired for the purpose of the present invention. The mesh size distribution of the AlF₃ particles did not change appreciably during the latter heat treatment.

As indicated above a particular procedure utilizing HF gas as fluorinating agent for the AlCl₃ comprises treating anhydrous AlCl₃ or the hydrate with HF gas (preferably anhydrous) at temperature sufficiently high to cause reaction between AlCl₃ and HF and to volatilize and maintain any water present in the system in the gas phase (preferably 100–170° C., consistent with avoidance of fusion, in case the hydrate is employed), but low enough to prevent excessive volatilization of AlCl₃ (preferably below about 125° C. when anhydrous AlCl₃ is treated), and thereafter activating the AlF₃ produced. Aluminum fluoride so prepared has also been found to be composed of crystallites of size substantially below 200 A. as desired for fluorination with HF according to a preferred embodiment of the invention. Gas phase preparation of catalyst is illustrated by the following example, in which parts expressed are by weight:

*Example B*

5000 parts of 4 to 14 mesh anhydrous aluminum chloride of commercial grade were charged to a nickel reactor and heated therein while passing through the reactor a stream of anhydrous HF gas, to bring about the following reaction:

$$AlCl_3 + 3HF \rightarrow AlF_3 + 3HCl$$

The HF was admitted at a sufficeintly slow rate to keep the temperature in the reaction zone (exothermic reaction) below about 90° C. to prevent excessive loss of AlCl₃ by volatilization. As the reaction neared completion, as evidenced by a sharp decline in reactor temperature, heat was applied externally to the reactor and temperature raised to about 300° C. while still continuing passage of as low stream of HF through the tube, until last traces of AlCl₃ were converted to AlF₃. The AlF₃ so formed was then activated by heating it in a stream of oxygen at about 450–500° C. for about 30 minutes. The size and shape of the solid material was about the same before and after treatment with gaseous HF. 2670 parts of anhydrous aluminum fluoride containing 98% AlF₃ and less than 0.15% chlorine, were recovered. An X-ray diffraction pattern of the material prepared according to the latter gas phase procedure was made which indicated crystallite size to be in the range 100–200 Angstrom units radius, the average being 140 A., i. e. the crystallite size was so small as to be indicative of "amorphous" structure as desired for fluorination according to the present invention.

If desired, the catalyst may be used in the form of a fluidized solid bed or suspended on a non-siliceous inert carrier such as activated alumina, metal fluorides or nickel. Suitable methods for preparing this suspended catalyst include dissolving the aluminum compound in a solvent therefor, applying the solution to the carrier, evaporating the solvent and then treating the aluminum compound impregnated carrier with fluorinating agent. According to an alternative procedure, the aluminum compound, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a gas stream, condensed on the carrier, and then treated to convert it to aluminum fluoride.

While the mechanism and reaction of this invention is not entirely clear, the overall effect, when CCl₄ is employed as starting material and under particular operating conditions, appears to be exemplified by the following equation:

$$CCl_4 + 2HF \rightarrow CCl_2F_2 + 2HCl$$

Reaction temperatures are maintained at or above the level at which fluorination of the particular saturated organic halogenated compound begins to take place in the presence of gaseous HF and solid AlF₃. Generally speaking, some fluorination may be noted at temperature as low as about 100° C. but reaction proceeds at a more satisfactory rate and fluorination will generally be more complete at temperature above this value. Fluorination proceeds and important yields of sought-for product may be realized at temperature as high as about 600° C. However, at about 600° C. a slow but preceptible transformation of AlF₃ crystalites into crystals having larger size may be noted. When the size of such crystals substantially exceeds the 500 Angstrom units radius set forth above, catalyst activity is substantially impaired. Hence, for reasons of economy and to avoid deactivation of the AlF₃ catalyst, temperatures above about 600° are avoided. Of the methanes, CCl₄ fluorination is preferably carried out in the approximate range 175–300° C. (when major amounts of CCl₂F₂ are desired), CHCl₃ in the approxiimate range 250–350° C. and CH$_2$Cl$_2$ in the approximate range of 300–400° C. Somewhat higher fluorination temperature is employed when treating two carbon atom halogenated starting materials (ethanes) than when treating methanes. Fluorination of ethanes is generally initiated at temperature of about 200° C. while preferred operation is carried out in the aproximate range of 300–500° C.

Temperature also exerts a noticeable effect upon the organic fluorine compound produced. Higher temperatures tend to produce products having relatively greater amounts of fluorine in the molecule (e. g. formation of CClF$_3$ when CCl$_4$ is the starting material), whereas temperatures in the lower regions of the ranges indicated above tend to favor the formation of products having relatively lower proportions of fluorine in the molecule (e. g. formation of CCl$_3$F from CCl$_4$). Hence choice of reaction temperature will be determined to a degree by the product which is desired. The foregoing indicated temperatures designate temperatures within the catalyst bed, i. e. inside the reaction tube. Due to the exothermic nature of the fluorination reactions temperatures measured outside but immediately adjacent to the reaction tube and inside the electrical resistance furnace employed to heat the tube are generally only a few degrees higher than internal catalyst bed temperatures, e. g. about 5 to 10 C. higher in the case of a ½" I. D. reaction tube.

The molar ratio of HF to starting material is determined largely by the amount of fluorine desired in the sought-for product. That is, if a highly fluorinated product is desired and the starting material is originally of low fluorine content and contains a relatively large number of halogen atoms other than fluorine to be substituted, correspondingly large amounts of HF are introduced into the reactor with the starting material. One mol of HF for each atom of other halogen to be substituted is the theoretical amount. On the other hand, from a practical point of view it is desirable to maintain the ratio of HF to organic sufficiently low so that a higher percentage utilization of fluorine will be obtained thereby simplifying the potentially difficult problem of recovering HF from the product mixture. Hence, at least about 25% and not substantially more than about 100% of the theoretical amount of HF is introduced with the organic compound into the fluorination reactor. Preferred percentages are 50–75% of the theoretical amount of HF. For example, when fluorinating CCl$_4$ with the object of preparing CCl$_2$F$_2$, preferred molar ratios of HF to CCl$_4$ lie in the approximate range 1:1 to 1.5:1.

Time of contact of organic halogenated compound starting material with aluminum fluoride catalyst may be varied to some extent without noticeable sacrifice in advantageous high process efficiency. However, if contact time is excessive, i. e. at very low space velocities, the capacity of the reactor is low. On the other hand, at excessively high space velocities (which cause short contact time) the reaction of starting material to form desired product may be incomplete, thereby entailing possible high cost of recovering and recycling unreacted material to subsequent operation. Accordingly, the time of contact (space velocity) is determined by balancing the economic advantages of high reactor throughput obtained at short contact times against the cost of recovery of unreacted starting material. In a particular operation optimum rate of flow of starting material through the reaction zone is dependent upon variables such as scale of operation, quantity of catalyst in the reactor and specific apparatus employed and may be best determined by a test run.

A particular embodiment of the present invention lies in suitably adjusting reaction conditions, e. g. temperature and ratio HF/reactant as described above, so that a high proportion of halogen other than fluorine is substituted by fluorine. For example, by treating CCl$_4$ with HF, preferably at temperature of 250 to 500° C., major yields of CClF$_3$ may be obtained.

For convenience, atmospheric pressure operation is preferred but the reaction may, if desired, be carried out at superatmospheric or subatmospheric pressure, the choice of presssure being one of convenience, e. g. determined by the nature of prior treatment of starting material or subsequent treatment of the reaction product.

Generally, the process of the invention is carried out by contacting the organic halogenated compound with an aluminum fluoride catalyst described above at temperature at which fluorination takes place in the presence of gaseous HF. Operations may be suitably carried out by introducing the gaseous mixture of these reactants into a reaction zone containing aluminum fluoride catalyst and heating said mixture in the zone at temperatures heretofore indicated for a time sufficient to convert an appreciable amount of the organic halogenated compound to fluorinated compound, withdrawing gaseous products from the zone and recovering said fluorinated material from the gaseous products. Although not limited to continuous operations, the process of our invention may be advantageously carried out thereby. The reactants heretofore indicated may be diluted with other gaseous material, e. g. an inert gas such as nitrogen, and the mixture of such inert gas and reactants introduced into the reaction zone and fluorination of the organic halogenated compound carried out in the presence of aluminum fluoride catalyst to produce the desired product.

The sought-for product in the gas stream exiting the reaction zone may be recovered in any suitable manner. The gas discharged from the reactor may be cooled and subjected to scrubbing with water, aqueous caustic solution (if it is desired to remove residual amounts of HCl and HF) then passed over calcium chloride or other drying agent to remove water. The identity and amount of product in the gas stream may be conveniently determined by conventional infra red analytical technique. The gaseous products may be condensed in a vessel maintained at a temperature substantially below the boiling point of the lowest boiling material present, e. g. by indirect cooling of the gas in a bath of acetone and carbon dioxide ice. The particular products recovered depend, as indicated above, upon starting material and reaction conditions such as temperature, molar ratio of the reactants, etc. Pure product may be recovered by distillation of condensates obtained above, and unreacted halogenated compound starting material recycled to subsequent operation.

Any suitable chamber or reactor tube constructed of inert material may be employed for carrying out the reaction provided the reaction zone is of sufficient length and cross-sectional area to accommodate the required amount of aluminum fluoride necessary to provide adequate gas contact area and at the same time afford sufficient free space for passage of the gas mixture at an economical rate of flow. Material such as nickel, graphite, Inconel and other materials resistant to HF may be suitable for reactor tube. Externally disposed reactor tube heating means such as electrical resistance heaters may be supplied for use in instances where reaction is not strongly exothermic.

The following examples illustrate practice of our invention, parts and percentages being by weight:

*Example 1*

80 parts of aluminum fluoride catalyst prepared by procedure described in Example A above and reactivated just before use by heating for one hour in a stream of nitrogen at about 300° C. were arranged in a fixed bed supported in a ½" integral diameter nickel tube. The tube was externally electrically heated over a length of 24 inches and the tube ends were fitted with pipe connections for the inlet and outlet of a gas stream. Suitable thermocouples were arranged externally of and adjacent to the nickel tube and catalyst bed and inside the furnace. Liquid CCl$_4$ was vaporized, mixed with gaseous HF in the proportion of 1.25 mols of HF per mol of CCl$_4$ and the mixture preheated to 130° C. and introduced at the rate of 1.0 mol of $CCl_4$ per hour into the feed end of the nickel tube and passed through the bed of $AlF_3$ catalyst. By adjusting the electrical heaters thereby to control the rate of heat input in the gas stream, the temperature of the reaction tube (as measured externally) was maintained at about 300° C. (corresponding with approximate 295° C. internal tube temperature). Gaseous products of the reaction were withdrawn from the discharge end of the nickel tube, cooled, and thence passed successively through a water scrubber, a calcium chloride drying tube and a condenser held at about minus 78° C. by means of an external cooling bath of carbon dioxide ice and acetone. Condensate collected in the water scrubber was combined with cold trap condensate and the mixture was fractionally distilled and found to have the following composition: $CCl_2F_2$, 32.0%; $CCl_3F$, 54.1%; $CClF_3$, 3.9% and $CCl_4$, 10.0%. Conversion of HF was 90%. Unfluorinated $CCl_4$ was substantially completely recoverable.

*Example 2*

300 parts of aluminum fluoride catalyst prepared by procedure of Example B above, regenerated before use by treatment with oxygen at 450° C. for 3 hours, and composed of crystallites having radius below 200 A. radius, were arranged in a fixed bed supported in a one inch I. D. nickel reaction tube of the type and arranged as described in Example 1. Gaseous $CCl_3CF_2Cl$ (having a boiling point of 92° C.) mixed with gaseous HF (1.8 to 2 mols HF per mol of $CCl_3CF_2Cl$) was passed through the nickel tube and bed of $AlF_3$ catalyst while maintaining the tube temperature at about 425° C. Feed rate of $CCl_3CF_2Cl$ was about 50 parts per hour. The gas efflux from the tube was cooled, scrubbed with water, dried and condensed. Conversion of HF to the more highly fluorinated product $CF_2ClCCl_2F$, $C_2F_4Cl_2$ and $CF_3CF_2Cl$ was 72%. Unfluorinated $CCl_3CF_2Cl$ was substantially completely recoverable.

*Example 3*

100 parts of aluminum fluoride catalyst prepared by procedure of Example B above were arranged in a fixed bed supported in a (½" I. D.) nickel reaction tube of the type and arranged as described in Example 1. Gaseous $CHCl_3$ mixed with gaseous HF (about 1.8 mols HF per mol of $CHCl_3$) was passed through the nickel tube and bed of $AlF_3$ catalyst while maintaining the tube temperature at about 350° C. Feed rate of $CHCl_3$ was about 120 parts per hour. The gas efflux from the tube was cooled, scrubbed with water, caustic, dried and condensed. Conversion of HF, as determined by analysis of the water scrubber liquid, was about 97%. Infra red analysis of the dry effluent gas indicated that the gas contained essentially only $CHF_3$.

*Example 4*

100 parts of aluminum fluoride catalyst prepared by procedure of Example B above, regenerated before use by treatment with oxygen at 500° C. for one hour, and composed of crystallites having radius below 200 A. radius, were arranged in a fixed bed supported in a (½" I. D.) nickel reaction tube of the type and arranged as described in Example 1. Gaseous $CH_2Cl_2$ mixed with gaseous HF (1.3 mols HF per mol of $CH_2Cl_2$) was passed through the nickel tube and bed of $AlF_3$ catalyst while maintaining the tube temperature at about 400° C. Feed rate of $CH_2Cl_2$ was about 100 parts per hour. The gas reflux in the tube was cooled, scrubbed with water, caustic, dried and condensed. During an operating period in which 535 parts of $CH_2Cl_2$ were fed, product formation was as follows: $CH_2F_2$ (B. P. minus 52° C.) 50 parts; $CH_2ClF$ (B. P. minus 11.0° C.) 75 parts. Conversion of HF to $CH_2F_2$ and $CH_2ClF$ was about 45%. Unfluorinated $CH_2Cl_2$ was substantially completely recoverable.

*Example 5*

100 parts of aluminum fluoride catalyst prepared by procedure of Example B above, regenerated before use by treatment with oxygen at 500° C. for one hour, and composed of crystallites having radius below 200 A. radius, were arranged in a fixed bed supported in a ½" I. D. nickel reaction tube of the type and arranged as described in Example 1. Gaseous $CCl_3CF_3$ (having a boiling point of 46.0° C.) mixed with gaseous HF (1.35 mols HF per mol of $CCl_3CF_3$) was passed through the nickel tube and bed of $AlF_3$ catalyst while maintaining the tube temperature at about 450° C. (about 440–445° C. internal tube temperature). Feed rate of $CCl_3CF_3$ was about 113 parts per hour. The gas efflux from the tube was cooled, scrubbed with water, dried and condensed. During an operating period in which 189 parts of $CCl_3CF_3$ and 27 parts HF were fed, product formation was as follows: $CF_3CF_2Cl$ (B. P. minus 39° C.) 21 parts; $CF_3CCl_2F$ (B. P. plus 1.8° C.) 95 parts; and unreacted $CF_3CCl_3$, 45 parts. Conversion of HF to $CF_3CF_2Cl$ was 30% and to $CF_3CCl_2F$ was 42%. Of the total HF consumed, recovery thereof as the more highly fluorinated products $CF_3CCl_2F$ and $CF_3CF_2Cl$ was substantially complete.

*Example 6*

200 parts of aluminum fluoride catalyst prepared by procedure of Example B above and composed of crystallites having radius below 200 A. radius, were arranged in a fixed bed supported in a 1" I. D. nickel reaction tube of the type and arranged as described in Example 1. Gaseous $CCl_2FCClF_2$ (having a boiling point of 47.7° C.) mixed with gaseous HF (1.44 mols HF per mol of $CCl_2FCClF_2$) was passed through the nickel tube and bed of $AlF_3$ catalyst while maintaining the tube temperature at about 346° C. Feed rate of $CCl_2FCClF_2$ was about 100 parts per hour. The gas efflux from the tube was cooled, scrubbed with water, dried and condensed. During an operating period in which 245 parts of $CCl_2FCClF_2$ and 38 parts HF were fed, product formation was as follows: $CF_3CF_2Cl$ (B. P. minus 39° C.) 26.4 parts; $C_2F_4Cl_2$ (B. P. plus 1.8° C.) 78 parts; and unreacted $CCl_2FCClF_2$ 104 parts. Conversion of HF was 47%.

*Example 7*

Aluminum fluoride catalyst prepared by procedure of Example B above, activated before use by treatment with oxygen-containing gas in the region 450–550° C. and composed of crystallites having radius below 200 Angstrom units, was arranged in a fixed bed supported in a nickel reaction tube of the type and arranged as described in Example 1. A gaseous mixture of $CCl_4$ and HF in molar ration of HF:$CCl_4$ of 1.2 was passed through the bed of $AlF_3$ catalyst while maintaining tube temperature at about 275° C. The gas efflux from the tube was cooled, scrubbed with water, dried and condensed. The product gas from the water scrubber had the following composition (by volume): $CCl_2F_2$ 17%; $CCl_3F$ 13%; and $CClF_3$ 58%.

Process for making the hereindescribed catalysts is claimed in copending application Serial No. 240,295, filed August 3, 1951, by C. Woolf and C. B. Miller, now U. S. P. 2,673,139 of March 23, 1954.

We claim:

1. The process for making a saturated chlorofluorocarbon compound containing not more than two carbon atoms which process comprises introducing, into a reaction zone containing substantially anhydrous aluminum fluoride catalyst, a gas phase mixture of substantially anhydrous hydrogen fluoride and a saturated organic completely halogenated carbon compound starting material containing not more than two carbon atoms and having at least two chlorine atoms attached to the same carbon atom and selected from the group consisting of $CCl_4$, $CCl_3CClF_2$, $CClF_3CF_3$ and $CCl_2FCClF_2$, said catalyst having crystallite size not substantially greater than about 500 Angstrom units radius and having been derived by reaction of aluminum chloride and HF, heating said mixture in said zone in contact with said catalyst at fluorination temperature in the range of about 175° C. to about 450° C. for time sufficient to fluorinate a substantial amount of said starting material to form gaseous reaction product comprising a saturated organic completely halogenated compound consisting of carbon, chlorine and fluorine and containing from one to five fluorine atoms and more fluorine than said starting material discharging said product from said zone, and recovering from said product a saturated organic completely halogenated compound consisting of carbon, chlorine and fluorine and containing from one to five fluorine atoms and more fluorine than said starting material.

2. The process for producing a fluorinated methane consisting of carbon, chlorine and fluorine which process comprises continuously introducing a gas phase mixture of substantially anhydrous hydrogen fluoride and $CCl_4$ into a reaction zone containing substantially anhydrous aluminum fluoride catalyst having crystallite size not substantially greater than about 500 Angstrom units radius and having been derived by reaction of aluminum chloride and HF, heating said mixture in said zone in contact with said catalyst at fluorination temperature in the range of about 175° C. to about 300° C. for time sufficient to fluorinate a substantial amount of said $CCl_4$ to form gaseous reaction product comprising $CCl_2F_2$, continuously withdrawing said product from said zone, and recovering $CCl_2F_2$ from said product.

3. The process of claim 1 in which the starting material is $CCl_3CF_3$, temperature is in the range of about 300° C. to about 450° C., the gaseous reaction product formed comprises a substantial amount of saturated organic completely halogenated compound consisting of carbon, chlorine and fluorine and containing from four to five fluorine atoms, and there is recovered from said product a saturated organic completely halogenated compound consisting of carbon, chlorine and fluorine and containing from four to five fluorine atoms.

4. The process of claim 1 in which the starting material is $CCl_2FCClF_2$, temperature is in the range of about 300° C. to about 450° C., the gaseous reaction product formed comprises a substantial amount of saturated organic completely halogenated compound consisting of carbon, chlorine and fluorine and containing from four to five fluorine atoms, and there is recovered from said product a saturated organic completely halogenated compound consisting of carbon, chlorine and fluorine and containing from four to five fluorine atoms.

References Cited in the file of this patent

UNITED STATES PATENTS

| | | |
|---|---|---|
| 1,996,115 | Lazier | Apr. 2, 1935 |
| 2,458,551 | Benning et al. | Jan. 11, 1949 |
| 2,471,525 | Hillyer et al. | May 31, 1949 |
| 2,478,201 | Miller | Aug. 9, 1949 |
| 2,495,407 | Chapman et al. | Jan. 24, 1950 |
| 2,576,823 | Benning et al. | Nov. 27, 1951 |